No. 730,383. Patented June 9, 1903.

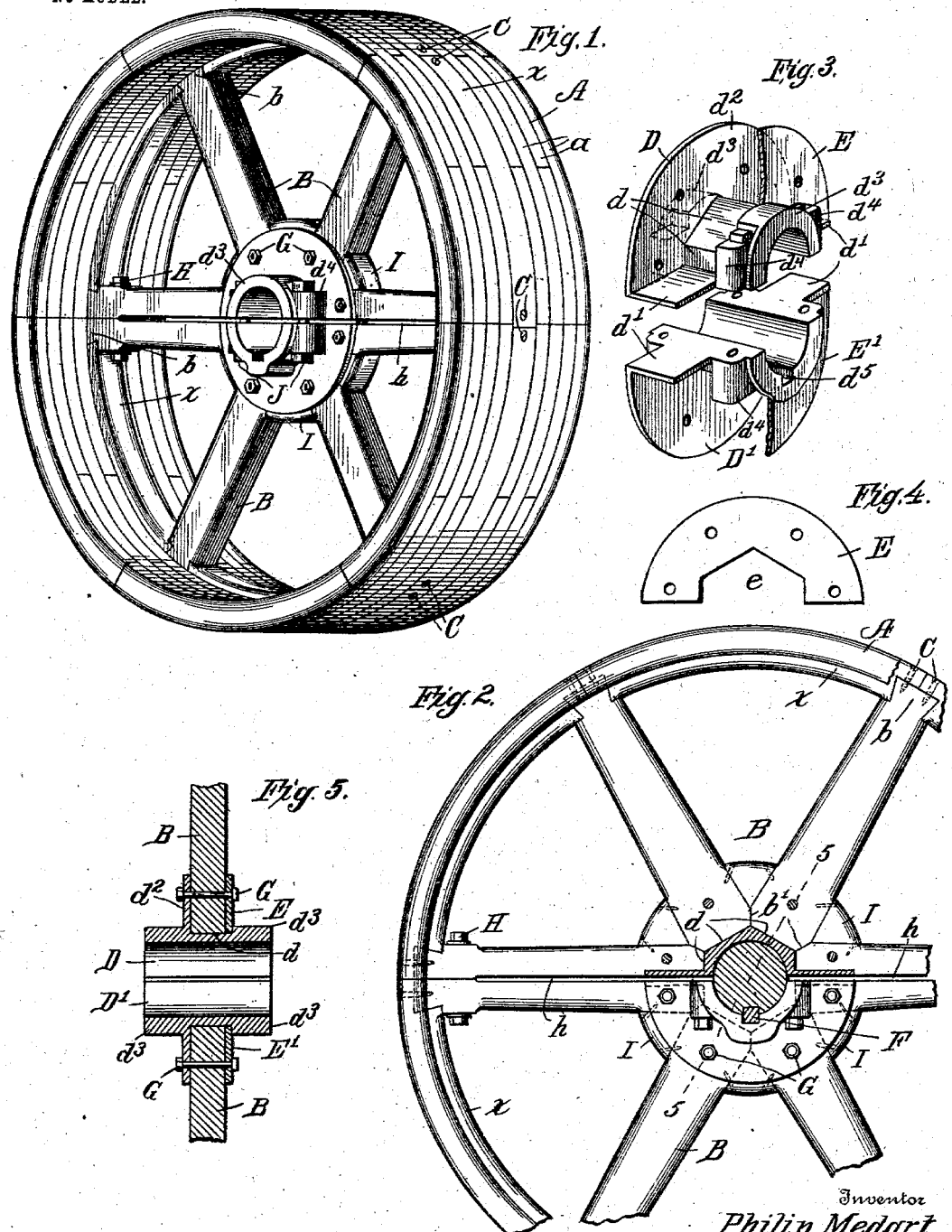

UNITED STATES PATENT OFFICE.

PHILIP MEDART, OF ST. LOUIS, MISSOURI.

BELT-PULLEY.

SPECIFICATION forming part of Letters Patent No. 730,383, dated June 9, 1903.

Application filed November 24, 1902. Serial No. 132,634. (No model.)

*To all whom it may concern:*

Be it known that I, PHILIP MEDART, a citizen of the United States, residing at St. Louis, in the State of Missouri, have invented certain new and useful Improvements in Belt-Pulleys, of which the following is a specification.

In an application for patent filed by me on November 22, 1902, Serial No. 132,474, I have shown a split belt-pulley in which the rim is composed of a series of wooden rings divided into segments and secured together on each side of a middle ring similarly formed, but of somewhat greater depth, and in which the wooden spokes are formed with tenons on their outer ends fitting dovetailed mortises in the middle ring. In the pulley described in my application referred to the inner ends of the spokes extend to the bore and are beveled so as to closely fit around the bore, being secured in place by flat hub-sections held together by bolts, which serve to clamp the inner ends of the spokes directly against the shaft or bushing. When a pulley of this class is made of very large diameter, clamping-bolts which merely produce a frictional connection by pressure on the shaft or bushing are found to be insufficient to withstand the strain incident to the long leverage in large pulleys, and it has been found necessary to provide the hub of the pulley when of large diameter with a key or similar locking device which will enable the pulley to be attached to the shaft without danger of slipping. When a key is employed, no bushings are used, the hub being brought into direct contact with the shaft and being grooved to receive the key, which also fits a groove in the shaft.

The object of my invention is to construct a pulley of large diameter with a split wooden rim and wooden spokes, each of which is of comparatively small cross-section and two of which on opposite sides of the bore are divided, and to connect these spokes at their inner ends by a divided hub adapted to be keyed to a shaft and of suitable construction to hold the inner ends of all the spokes in proper relation around the bore, while permitting the two sections of the pulley to be readily attached or detached when necessary.

In carrying out my invention the rim and spokes of the pulley may be constructed and connected in the same manner as that shown in my before-mentioned application. The pulley may be divided in a similar way; but the inner ends of the spokes instead of being attached to hub-sections applied to their opposite sides only are connected with a hub formed with seats to receive the inner ends of the spokes and with flanges that are attached to the opposite sides thereof. One of the hub-sections is formed with a groove for a key, and two of them are provided with supporting-flanges for the inner portions of the divided spokes, with perforated ears for the clamping-bolts and with flanges for confining the other two sections of the hub, which consist merely of flat semicircular plates adapted to be bolted to the sides of the spokes.

In the accompanying drawings, Figure 1 is a perspective view of a split wood pulley embodying my improvements. Fig. 2 shows a side elevation of a portion of the pulley with parts in section and parts broken away. Fig. 3 is a perspective view of the hub with the upper and lower sections separated and with parts broken away. Fig. 4 shows an elevation of one of the flat plates constituting one of the hub members. Fig. 5 shows a section on the line 5 5 of Fig. 2 with the shaft omitted.

The rim A of the pulley is made up of a series of wooden rings $a$, placed side by side and secured together, each ring being composed of a plurality of segments, which break joints with the segments in the adjacent rings in the usual way. The middle ring $x$ of the rim is made deeper than the others, and the spokes or arms B of the pulley are formed with dovetailed tenons $b$ on their outer ends, which engage corresponding mortises in the middle ring. Each spoke is secured to the middle ring by means of screws C, which are passed radially inward from the outside of the ring into the tenons. Preferably the joints of the segments composing the ring are made at the ends of the spokes, and the ends of the segments which overlap the ends of the spokes are attached thereto by the screws C.

The pulley is split or divided into two equal parts, the line of division running straight through the axis of the hub, through two of the arms or spokes, and through diametrically opposite portions of the rim. The two divided spokes are preferably made somewhat larger in cross-section than the others in order that each section of the divided spoke may be of sufficient size to afford the requisite strength. The outer portions of the divided spokes fit closely together, as indicated in Fig. 2, and transverse bolts H are provided, arranged close to the rim to connect the spoke-sections. Between these outer portions and the bore the divided spoke-sections are separated a slight distance by spaces $h$, which will allow the bore to be expanded and contracted sufficiently when securing the pulley to, taking it from, or adjusting it on the shaft. The inner portions of the spokes B are brought together around the bore or shaft-opening and are closely fitted by being beveled at $b'$ on lines radial to the axis of the pulley. The spokes do not extend quite to the bore or shaft-opening, but rest on seats formed in the hub.

The hub is formed of metal in order that it may be securely keyed directly to the shaft and in order that it may hold firmly the inner ends of the spokes. As before stated, I prefer to employ a metal hub when the pulley is of large diameter. The parts of the pulley shown in the accompanying drawings are of proper relative dimensions for a pulley having a diameter of forty-eight (48) inches. The same general construction may be employed in pulleys of larger diameter. Those of smaller diameter may have wooden hubs, although sometimes wooden hubs may be used in pulleys of forty-eight (48) inch diameter, or thereabout, and I may sometimes employ metal hubs in pulleys of smaller diameter. My object is to use wood whenever possible; but when it is necessary to key the pulley to the shaft I preferably always use a metal hub.

As shown most clearly in Fig. 3, the hub is formed in four parts, there being two parts D D' of similar shape and size and two parts E E' which are alike in all respects. Each part D or D' is formed with a body portion, having flat seats $d$ for the inner ends of the spokes, flanges $d'$ constituting supports for the inner portions of the divided spokes, and a flat semicircular vertical flange $d^2$, adapted to lie against the spokes on one side of the pulley. At each end and on opposite sides of the flange $d^2$ the body portion of the section D or D' is formed with a flange $d^3$, provided with lugs $d^4$, having holes for the clamping-bolts. Each casting D D' is formed with a semicircular recess to fit one-half of the shaft, and one of them is formed with a groove $d^5$ to receive the key F. The two remaining sections E E' of the hub are of the kind illustrated in Fig. 4, each being of a general semicircular form and provided with a recess $e$, adapted to receive the body portion of the sections D D'.

In connecting the hub-sections to the spokes the latter have their inner ends placed against the seats $d$, with their inner portions lying close to the flanges $d^2$. The inner portions of the divided spokes are fitted to the flanges $d'$ in the manner indicated in Fig. 2. The plates E E' are then applied to the opposite sides of the spokes, being dropped in behind the flanges $d^3$, and the members D D' and E E' are connected by bolts G, that extend parallel with the axis of the pulley through the hub members and through the spokes. The wedge-shaped bracing-blocks I shown in the drawings are similar to those shown in my application above mentioned.

It will be observed by reference to Fig. 2 that when the parts are assembled the hub has the flanges $d'$ arranged opposite to each other and that the members of the divided spokes are supported by these flanges on opposite sides of the line of division. The hub-sections D and D' are connected by four clamping-bolts J, arranged on opposite sides of the pulley and on opposite sides of the axis thereof. The pulley may be clamped on the shaft by means of these bolts; but such a connection would not be found to be sufficient for all purposes, and therefore the key F is employed. Both the clamping-bolts and the key therefore serve to connect the pulley with the shaft; but the main purpose of the clamping-bolts is to secure the two parts of the pulley together at the inner ends of the spokes, the outer ends of the spokes being connected by the bolts H. The spokes are of approximately the same width as the middle ring $x$. Their cross-section is comparatively small, and therefore the pulley will run easily without such agitation of the air as is incident to pulleys having thick wide arms. Preferably the edges of all the parts of the pulley are rounded off in order to present an attractive appearance.

The pulley is applied to, taken from, or adjusted on a shaft in much the same way as pulleys of a similar class; but the method of connecting the inner ends of the spokes where two of them are divided to a sectional or separable hub is believed to be novel and to possess material advantages.

I claim as my invention—

1. In a belt-pulley wherein the rim is composed of wooden segments and the spokes are of wood, and wherein the rim and two of the spokes are divided transversely diametrically through the axis of the pulley, the combination with the spokes of a metal hub comprising two hub-sections each formed with a body portion having seats for the inner ends of the spokes, laterally-projecting flanges supporting the inner ends of the divided spokes, a flange arranged at right angles to said laterally-projecting flanges and lying against the spokes on one side, and flanges and perforated lugs on opposite ends of the body portion; and two other hub-sections each consisting of a plate secured to one side of the spokes, and having its inner edge arranged between the spokes and one of the end flanges of the body portion of one of the first-mentioned hub-sections.

2. In a belt-pulley, the combination of a divided rim composed of middle segments and segments on each side thereof of less depth; solid spokes of substantially the same thickness as the middle segments and secured thereto, two divided spokes secured to the middle segment on opposite sides of the dividing-line of the rim and each having the outer ends of its two parts in contact close to the rim and bolted together, and a metal hub to which the inner ends of the spokes are secured, comprising two hub-sections each formed with a body portion having seats for the ends of the spokes, laterally-projecting flanges supporting the inner ends of the divided spokes, a flange arranged at right angles to said laterally-projecting flanges and lying against the spokes on one side, and flanges and perforated lugs on opposite ends of the central portion; and two other hub-sections each consisting of a flat plate secured to one side of the spokes and having its inner edge arranged between the spokes and one of the end flanges on the end of the body portion of one of the first-mentioned hub-sections.

In testimony whereof I have hereunto subscribed my name.

PHILIP MEDART.

Witnesses:
A. M. PARKINS,
J. A. MACDONALD.